(12) United States Patent
Ananthanarayanan et al.

(10) Patent No.: US 6,552,294 B1
(45) Date of Patent: Apr. 22, 2003

(54) METHOD FOR METALLURGICALLY ATTACHING TOGETHER TWO MEMBERS

(75) Inventors: Ventakatasubramanian Ananthanarayanan, Beavercreek, OH (US); Desra N. Herbst, Dayton, OH (US); Kevin J. Szeszulski, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/969,066

(22) Filed: Oct. 2, 2001

(51) Int. Cl.⁷ .................. B23K 11/02; B23K 11/32
(52) U.S. Cl. ............... 219/107; 219/59.1; 285/189
(58) Field of Search ................ 219/107, 59.1, 219/119, 60.2; 285/189, 288.1

(56) References Cited

U.S. PATENT DOCUMENTS

| | | | |
|---|---|---|---|
| 2,447,259 A | * | 8/1948 | Lucke ..................... 285/189 |
| 4,322,598 A | * | 3/1982 | Blair ....................... 219/107 |
| 4,676,427 A | * | 6/1987 | Constance ............... 219/107 |
| 6,390,124 B1 | * | 5/2002 | Kido et al. ............... 123/516 |

* cited by examiner

Primary Examiner—M. Alexandra Elve
Assistant Examiner—Len Tran
(74) Attorney, Agent, or Firm—Scott A. McBain

(57) ABSTRACT

A first method for metallurgically attaching together two members. A first member is obtained having a through hole and having a longitudinally-projecting flange surrounding the through hole. A second member is obtained having a transversely-projecting annular rim. The second member is at least partially positioned in the through hole of the first member with the flange of the first member projecting away from the rim. The first and second members are resistance welded together, wherein after the weld is created, the rim of the second member is seated on the first member. In an other method, which is similar to the first method, the second member has no rim.

21 Claims, 3 Drawing Sheets

METHOD FOR METALLURGICALLY ATTACHING TOGETHER TWO MEMBERS

TECHNICAL FIELD

The present invention relates generally to metallurgy, and more particularly to a method for metallurgically attaching together two members.

BACKGROUND OF THE INVENTION

Resistance welding (also known as electric-resistance welding) is a known metallurgical process wherein metal is heated by its own resistance to a semi-fused or fused state by the passage of very heavy electric currents for very short lengths of time and then welded by the application of pressure.

Conventional methods for metallurgically attaching together two parts also include a known method for metallurgically attaching together an inlet/outlet tube to a vehicle fuel tank cover. In the known method, a sheet-metal plate of low-carbon steel is obtained for the vehicle fuel tank cover, and a low-carbon steel tube is obtained for the inlet/outlet tube. A through hole is punched in the plate creating a flange which surrounds the through hole and which projects longitudinally away from the plate. Forming operations on the tube create a transversely-projecting annular rim on the tube. The tube is sized so that it is insertable in the through hole so as to longitudinally extend beyond both longitudinal ends of the through hole. The tube is inserted in the through hole so that the rim of the tube is seated on the plate and the flange of the plate projects away from the rim. Then, the tube and the plate are brazed together near the through hole.

For the brazing operation, a furnace is required having specific temperatures and temperature gradients. The furnace must be kept with a controlled reducing atmosphere to remove the oxides from the plate and the tube before the brazing is actually performed. Also, a copper ring must be used for the filler material to perform the brazing. A ceramic chain pulley mechanism is required to move the parts through the furnace.

What is needed is a less expensive method for metallurgically attaching together two members, such as metallurgically attaching together an inlet/outlet tube to a vehicle fuel tank cover.

SUMMARY OF THE INVENTION

A first method of the invention is for metallurgically attaching together two members. The method includes steps a) through d). Step a) includes obtaining a first member having a through hole with a longitudinal axis and first and second longitudinal ends and having a longitudinally-projecting flange surrounding the through hole. Step b) includes obtaining a second member having a transversely-projecting annular rim. Step c) includes, after steps a) and b), at least partially disposing the second member in the through hole of the first member with the flange of the first member projecting away from the rim of the second member. Step d) includes, after step c), resistance welding together the first and second members so as to create a weld, wherein after the weld is created, the rim of the second member is seated on the first member at the first longitudinal end of the through hole.

In one application of the first method, the first member is a plate, such as a vehicle fuel tank cover, and the second member is a tube, such as an inlet/outlet tube. In one implementation, step d) creates a resistance weld between the flange of the plate and the tube. In another implementation, step d) creates a resistance weld between the plate and the rim of the tube. In an additional implementation, step d) first creates a resistance weld between the flange of the plate and the tube and then creates a resistance weld between the plate and the rim of the tube.

An other method of the invention is for metallurgically attaching together two members. The other method includes steps a) through d). Step a) includes obtaining a first member having a through hole with a longitudinal axis and first and second longitudinal ends and having a longitudinally-projecting flange surrounding the through hole. Step b) includes obtaining a second member. Step c) includes, after steps a) and b), at least partially disposing the second member in the through hole of the first member. Step d) includes, after step c), resistance welding together the first and second members so as to create a weld.

In one application of the other method, the first member is a plate, such as a vehicle fuel tank cover, and the second member is a tube, such as an inlet/outlet tube. The other method is useful when it is desired only to create a resistance weld between the flange of the plate and the tube, and for this weld, as can be appreciated by the artisan, the tube does not require a rim.

Several benefits and advantages are derived from the invention. Resistance welding is less expensive than brazing. In the application for metallurgically attaching together a vehicle fuel tank cover and an inlet/outlet tube, instead of costing about one dollar per attachment it is expected to cost only a few cents per attachment.

DESCRIPTION OF THE PREFERRED EMBODIMENTS

Figure 1:
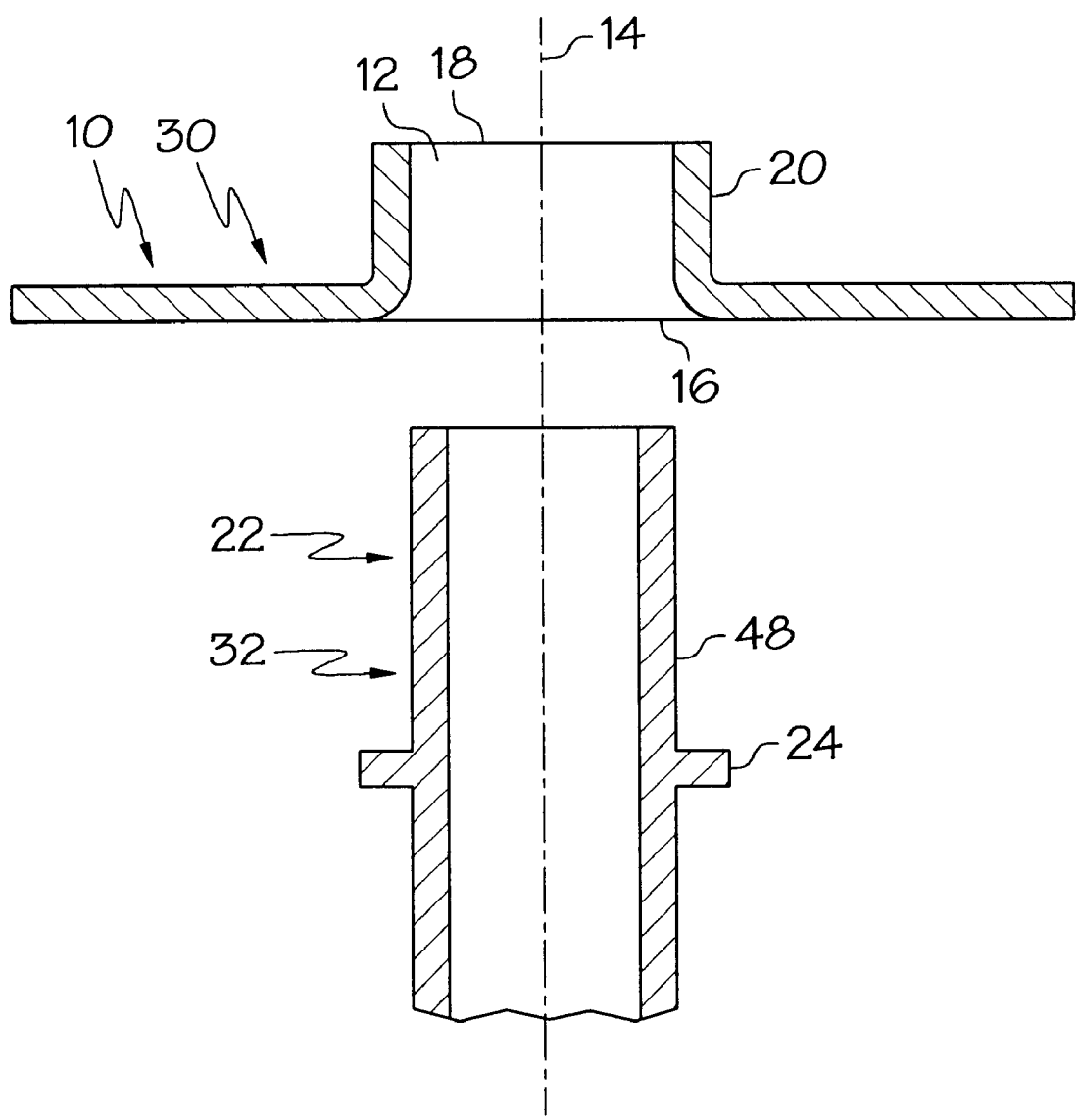
FIG. 1 is a schematic, side cross-sectional view of an unattached first member in the form of a plate, having a through hole, and of an unattached second member in the form of a tube.
Figure 2:
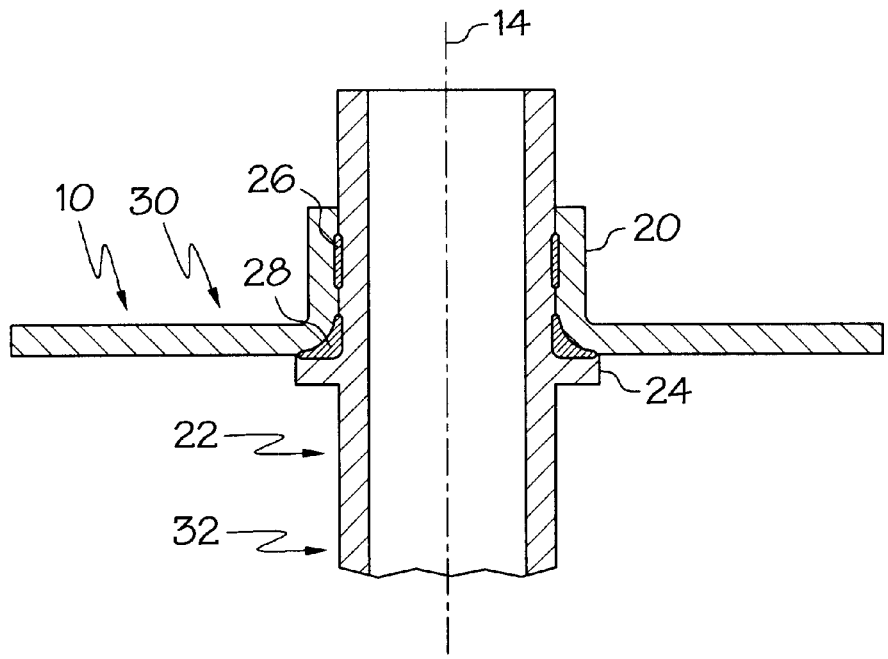
FIG. 2 is a schematic, side cross-sectional view of the first and second members of FIG. 1 metallurgically attached together by one method of the invention.

Referring to FIGS. 1–2, wherein like numerals represent like elements throughout, a first method of the invention is for metallurgically attaching together two members comprising steps a) through d). Step a) includes obtaining a first member 10 including a through hole 12 having a longitudinal axis 14 and first and second longitudinal ends 16 and 18 and including a longitudinally-projecting flange 20 surrounding the through hole 12. Step b) includes obtaining a second member 22 including a transversely-projecting annular rim 24. Step c) includes, after steps a) and b), at least partially disposing the second member 22 in the through hole 12 of the first member 10 with the flange 20 of the first member 10 projecting away from the rim 24 of the second member 22. Step d) includes, after step c), resistance welding together the first and second members 10 and 22 so as to create a weld (two annular welds 26 and 28 are shown in FIG. 2), wherein after the weld 26 and 28 is created, the rim 24 of the second member 22 is seated on the first member 10 at the first longitudinal end 16 of the through hole 12. It is noted that resistance welding is also known as electric-resistance welding.

In one example, the first member 10 is a plate 30, and the through hole 12 is a substantially circular through hole. In one construction, the plate 30 is a sheet metal plate and comprises low carbon steel such as AISI 1008 to 1010. In the same or different example, the second member 22 is a tube 32. In one construction, the tube 32 comprises low carbon steel such as AISI 1008 to 1010. In one application, the plate 30 is a vehicle fuel tank cover having a thickness of generally 2 millimeters, the through hole 12 has a diameter of generally 6 to 7 millimeters, and the flange 20 projects generally at least 4 millimeters from the plate 30. In this application, the tube 32 is an inlet/outlet tube having a wall thickness of generally 2 millimeters and an outside diameter equal to the diameter of the through hole 12 plus or minus one millimeter. The rim 24 of the tube 32 projects generally 2 millimeters. After the weld 26 and 28 is created, the tube 32 longitudinally extends beyond the second longitudinal end 18 of the through hole 12. Other examples of the first and second members, their purposes, shapes, compositions, and dimensions, etc. are left to the artisan. Although the following discussion is presented in terms of a plate and tube, it is understood to apply to any first and second member.

Figure 3:
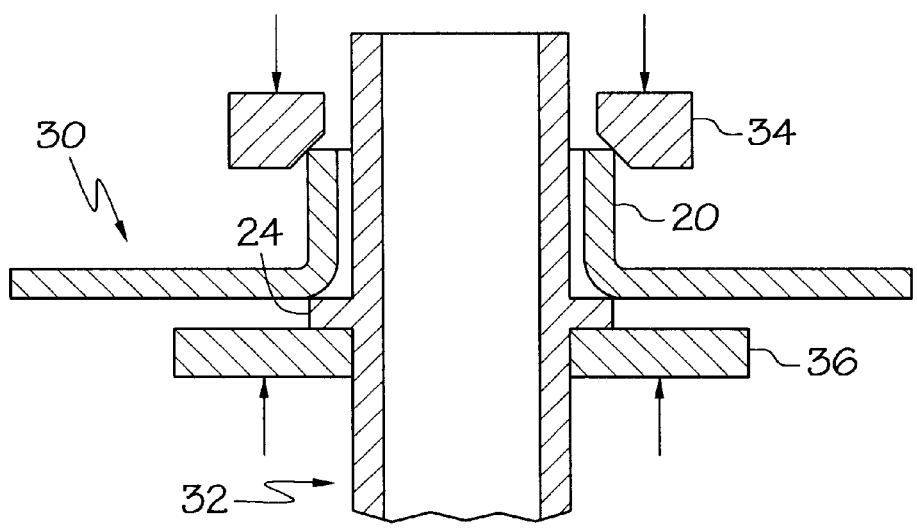
FIG. 3 is a schematic, side cross-sectional view of the plate and tube of FIG. 1, wherein the tube has a non-interference fit with the through hole, and also including first and second electrodes with the first electrode shaped and positioned for creating an interference fit with the flange of the plate and a resistance weld between the flange of the plate and the tube.
Figure 4:
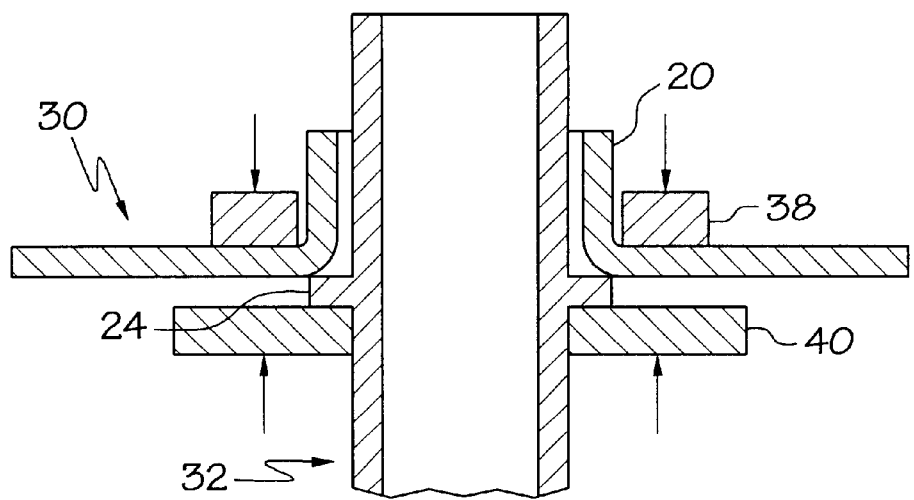
FIG. 4 is a view, as in FIG. 3, but with different first and second electrodes, wherein the tube has a non-interference fit with the through hole, and wherein the first electrode has a non-interference fit with the flange and is seated on the surface of the plate for creating a resistance weld between the plate and the rim of the tube.

In one implementation of the first method, as seen in FIGS. 3 and 4, the tube 32 and the through hole 12 do not have an interference fit. Here, step c) fully disposes the tube 32 in the through hole 12 of the plate 30 with the rim 24 of the tube 32 seated on the plate 30 at the first longitudinal end 16 of the through hole 12.

Referring to FIG. 3, in one modification of this implementation step d) includes longitudinally engaging the flange 20 of the plate 30 with a first electrode 34 shaped (such as with an angled surface as seen in FIG. 3) to create interference between the flange 20 and the tube 32, longitudinally engaging the rim 24 of the tube 32 with a second electrode 36, passing electric current between the first and second electrodes 34 and 36 through the plate 30 and the tube 32, and relatively moving the first and second electrodes 34 and 36 longitudinally toward each other. Unnumbered arrows in the figures indicate the direction for relatively moving together, and applying pressure to, the electrodes. In one variation, step d) creates a resistance weld 26 between the flange 20 of the plate 30 and the tube 32. When annular electrodes 34 and 36 are used, the resistance weld 26 is an annular weld. In one example (the vehicle fuel tank cover and inlet/outlet tube example), pulses (totaling generally ⅓ of a second) of electric current of generally 5,000 amperes are applied while applying a force of generally 300 to 800 pounds to the electrodes 34 and 36. This softens and deforms the flange 20 into an interference fit against the tube 32 as the first electrode 34 moves down the flange 20 to the surface of the plate 30. In another variation, step d) also creates a resistance weld 28 between the plate 30 and the rim 24 of the tube 32 after creating the resistance weld 26 between the flange 20 of the plate 30 and the tube 32. In one example, after weld 26 is created and the first electrode 34 is forcibly seated (with generally 300 to 800 pounds of force) against the surface of the plate 30, more electric current is applied for generally ⅓ of a second at generally 15,000 to 20,000 amperes to create weld 28. In the same or another example, during welding an electrically-insulating support (not shown) is disposed between the second electrode 36 and the plate 30 radially outward from the rim 24.

Referring to FIG. 4, in another modification of this implementation, step d) includes longitudinally engaging the plate 30 with a first electrode 38, longitudinally engaging the rim 24 of the tube 32 with a second electrode 40, and passing electric current between the first and second electrodes 38 and 40 through the plate 30 and the tube 32, wherein the first electrode 38 does not longitudinally engage the flange 20 of the plate 30. In one variation, step d) creates a resistance weld 28 between the plate 30 and the rim 24 of the tube 32. In one example (the vehicle fuel tank cover and inlet/outlet tube example), the first electrode 34 is forcibly seated (with generally 300 to 800 pounds of force) against the surface of the plate 30, and electric current is applied for generally ⅓ of a second at generally 15,000 to 20,000 amperes to create weld 28. In the same or another example, during welding an electrically-insulating support (not shown) is disposed between the second electrode 40 and the plate 30 radially outward from the rim 24. It is noted that the gap between the tube 32 and the flange 20 may be less than that shown in FIG. 4 and adjusted to promote a suitable weld current path.

Figure 5:
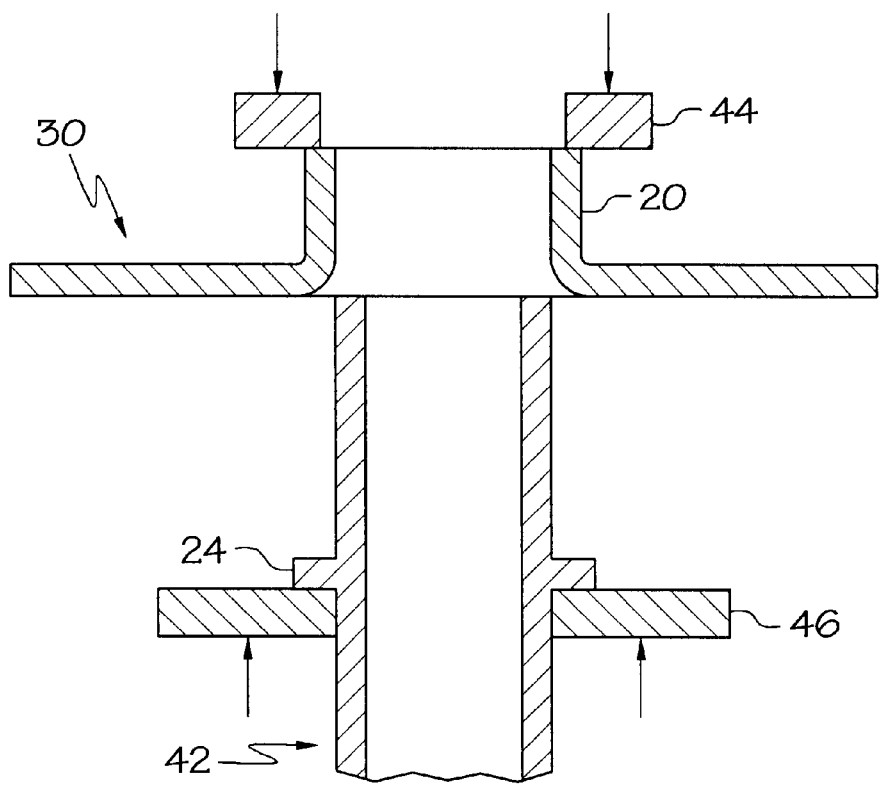
FIG. 5 is a view, as in FIG. 3, but with different first and second electrodes and a different tube, wherein the tube has an interference fit with the through hole, and wherein the first electrode is shaped and positioned to longitudinally engage the flange of the plate for creating a resistance weld between the flange of the plate and the tube.

In another implementation of the first method, as seen in FIG. 5, a different tube 42 and the through hole 12 do have an interference fit. Here, step c) only partially disposes the tube 42 in the through hole 12 of the plate 30 (such as through a lead-in chamfer). Step d) includes longitudinally engaging the flange 20 of the plate 30 with a first electrode 44, longitudinally engaging the rim 24 of the tube 42 with a second electrode 46, passing electric current between the first and second electrodes 44 and 46 through the plate 30 and the tube 42, and relatively moving the first and second electrodes 44 and 46 longitudinally toward each other until the rim 24 of the tube 42 is seated on the plate 30 at the first longitudinal end 16 of the through hole 12. In one variation, step d) creates a resistance weld between the flange 20 of the plate 30 and the tube 42 (in a similar manner to the previously-described creation of weld 26 for tube 32). In another variation, step d) also creates a resistance weld between the plate 30 and the rim 24 of the tube 42 (in a similar manner to the previously-described creation of weld 28 for tube 32) after creating the resistance weld between the flange 20 of the plate 30 and the tube 42.

A second method of the invention is for metallurgically attaching together a first member 10 and a second member 22. The second method includes steps a) through d). Step a) includes creating a through hole 12 in the first member 10 so as to produce an annular flange 20 surrounding the through hole 12, wherein the through hole 12 has a longitudinal axis 14, first and second longitudinal ends 16 and 18, and substantially matches a first portion 48 of the second member 22, and wherein the flange 20 projects longitudinally away from the first member 10. Step b) includes creating an annular rim 24 in the second member 22 proximate the first portion, wherein the rim 24 projects transversely away from the first portion 48. Step c) includes, after steps a) and b), at least partially disposing the second member 22 in the through hole 12 of the first member 10 with the flange 20 of the first member 10 projecting away from the rim 24 of the second member 22. Step d) includes, after step c), resistance welding together the first and second members 10 and 22 so as to create a weld (two welds 26 and 28 are shown in FIG. 2), wherein after the weld 26 and 28 is created, the rim 24 of the second member 22 is seated on the first member 10 at the first longitudinal end 16 of the through hole 12.

In one example of the second method, the first member 10 is a plate 30, the through hole 12 is a substantially circular through hole, the second member 22 is a tube 32, and the first portion 48 of the tube 32 has a substantially circular outside diameter. In one implementation, step d) creates a resistance weld 26 between the flange 20 of the plate 30 and the tube 32. In another implementation, step d) creates a resistance weld 28 between the plate 30 and the rim 24 of the tube 32.

A third method of the invention is for metallurgically attaching together an inlet/outlet tube to a vehicle fuel tank cover. The third method includes steps a) through d). Step a) includes obtaining a vehicle fuel tank cover including a through hole having a longitudinal axis and first and second longitudinal ends and including a longitudinally-projecting flange surrounding the through hole. Step b) includes obtaining an inlet/outlet tube including a transversely-projecting annular rim. Step c) includes, after steps a) and b), at least partially disposing the inlet/outlet tube in the through hole of the vehicle fuel tank cover with the flange of the vehicle fuel tank cover projecting away from the rim of the inlet/outlet tube. Step d) includes, after step c), resistance welding together the vehicle fuel tank cover and the inlet/outlet tube so as to create a weld, wherein after the weld is created, the rim of the inlet/outlet tube is seated on the vehicle fuel tank cover at the first longitudinal end of the through hole, and wherein the inlet/outlet tube longitudinally extends beyond the second longitudinal end of the through hole.

In one embodiment, the previously-discussed electrodes are installed in "T"-shaped electrode holders of a resistance welding machine (not shown). In one example, not shown, each electrode is formed from two sections which are brought together around the corresponding one of the first and second members and engage that member. The electrode sections have surfaces generally corresponding to the shape of the engaged portion of that member. The electrode sections are attached together before installing the electrode in the corresponding upper or lower one of the "T"-shaped electrode holders of the resistance welding machine.

An other method of the invention is for metallurgically attaching together two members. The other method includes steps a) through d). Step a) includes obtaining a first member 10 having a through hole 12 with a longitudinal axis 14 and first and second longitudinal ends 16 and 18 and having a longitudinally-projecting flange 20 surrounding the through hole 12. Step b) includes obtaining a second member 22. Step c) includes, after steps a) and b), at least partially disposing the second member 22 in the through hole 12 of the first member 10. Step d) includes, after step c), resistance welding together the first and second members 10 and 22 so as to create a weld 28.

In one application of the other method, the first member 10 is a plate 30, such as a vehicle fuel tank cover, and the second member 22 is a tube 32, such as an inlet/outlet tube. The other method is useful when it is desired only to create a resistance weld 28 between the flange 20 of the plate 30 and the tube 32, and for this weld 28, as can be appreciated by the artisan, the tube 32 does not require a rim 24. The actual welding can be visualized by mentally replacing the rim 24 of the tube 32 in the figures and in the previous discussion of the first, second, and third methods with an electrical insulation portion of the resistance welding apparatus, as can be understood by the artisan.

Several benefits and advantages are derived from the invention. Resistance welding is less expensive than brazing. In the application for metallurgically attaching together a vehicle fuel tank cover and an inlet/outlet tube, instead of costing about one dollar per attachment it is expected to cost only a few cents per attachment.

The foregoing description of a several methods of the invention has been presented for purposes of illustration. It is not intended to be exhaustive or to limit the invention to the precise procedure or precise form disclosed, and obviously many modifications and variations are possible in light of the above teaching. It is intended that the scope of the invention be defined by the claims appended hereto.

What is claimed is:

1. A method for metallurgically attaching together two members comprising the steps of:
   a) obtaining a first member including a through hole having a longitudinal axis and first and second longitudinal ends and including a longitudinally-projecting flange surrounding the through hole;
   b) obtaining a second member including a transversely-projecting annular rim;
   c) after steps a) and b), at least partially disposing the second member in the through hole of the first member with the flange of the first member longitudinally projecting away from the rim of the second member; and
   d) after step c), resistance welding together the first and second members so as to create a weld, wherein after the weld is created, the rim of the second member is seated on the first member at the first longitudinal end of the through hole.

2. The method of claim 1, wherein the first member is a plate, and wherein the through hole is a substantially circular through hole.

3. The method of claim 2, wherein the second member is a tube.

4. The method of claim 3, wherein the tube and the through hole do not have an interference fit, and wherein step c) fully disposes the tube in the through hole of the plate with the rim of the tube seated on the plate at the first longitudinal end of the through hole.

5. The method of claim 4, wherein step d) includes longitudinally engaging the flange of the plate with a first electrode shaped to create interference between the flange and the tube, longitudinally engaging the rim of the tube with a second electrode, passing electric current between the first and second electrodes through the plate and the tube, and relatively moving the first and second electrodes longitudinally toward each other.

6. The method of claim 5, wherein step d) creates a resistance weld between the flange of the plate and the tube.

7. The method of claim 6, wherein step d) also creates a resistance weld between the plate and the rim of the tube after creating the resistance weld between the flange of the plate and the tube.

8. The method of claim 4, wherein step d) includes longitudinally engaging the plate with a first electrode, longitudinally engaging the rim of the tube with a second electrode, and passing electric current between the first and second electrodes through the plate and the tube, wherein the first electrode does not longitudinally engage the flange of the plate.

9. The method of claim 8, wherein step d) creates a resistance weld between the plate and the rim of the tube.

10. The method of claim 3, wherein the tube and the through hole have an interference fit, and wherein step c) only partially disposes the tube in the through hole of the plate.

11. The method of claim 10, wherein step d) includes longitudinally engaging the flange of the plate with a first electrode, longitudinally engaging the rim of the tube with a second electrode, passing electric current between the first and second electrodes through the plate and the tube, and relatively moving the first and second electrodes longitudinally toward each other until the rim of the tube is seated on the plate at the first longitudinal end of the through hole.

12. The method of claim 11, wherein step d) creates a resistance weld between the flange of the plate and the tube.

13. The method of claim 12, wherein step d) also creates a resistance weld between the plate and the rim of the tube.

14. The method of claim 3, wherein step d) creates a resistance weld between the flange of the plate and the tube.

15. The method of claim 14, wherein step d) also creates a resistance weld between the plate and the rim of the tube.

16. The method of claim 3, wherein step d) creates a resistance weld between the flange of the plate and the tube.

17. A method for metallurgically attaching together a first member and a second member comprising the steps of:

a) creating a through hole in the first member so as to produce an annular flange surrounding the through hole, wherein the through hole has a longitudinal axis, first and second longitudinal ends, and substantially matches a first portion of the second member, and wherein the flange projects longitudinally away from the first member;

b) creating an annular rim in the second member proximate the first portion, wherein the rim projects transversely away from the first portion;

c) after steps a) and b), at least partially disposing the second member in the through hole of the first member with the flange of the first member longitudinally projecting away from the rim of the second member; and d) after step c), resistance welding together the first and second members so as to create a weld, wherein after the weld is created, the rim of the second member is seated on the first member at the first longitudinal end of the through hole.

18. The method of claim 17, wherein the first member is a plate, wherein the through hole is a substantially circular through hole, wherein the second member is a tube, and wherein the first portion of the tube has a substantially circular outside diameter.

19. The method of claim 18, wherein step d) creates a resistance weld between the flange of the plate and the tube.

20. The method of claim 18, wherein step d) creates a resistance weld between the plate and the rim of the tube.

21. A method for metallurgically attaching together an inlet/outlet tube to a vehicle fuel tank cover comprising the steps of:

a) obtaining a vehicle fuel tank cover including a through hole having a longitudinal axis and first and second longitudinal ends and including a longitudinally-projecting flange surrounding the through hole;

b) obtaining an inlet/outlet tube including a transversely-projecting annular rim;

c) after steps a) and b), at least partially disposing the inlet/outlet tube in the through hole of the vehicle fuel tank cover with the flange of the vehicle fuel tank cover longitudinally projecting away from the rim of the inlet/outlet tube; and d) after step c), resistance welding together the vehicle fuel tank cover and the inlet/outlet tube so as to create a weld, wherein after the weld is created, the rim of the inlet/outlet tube is seated on the vehicle fuel tank cover at the first longitudinal end of the through hole, and wherein the inlet/outlet tube longitudinally extends beyond the second longitudinal end of the through hole.

* * * * *

(12) EX PARTE REEXAMINATION CERTIFICATE (5523rd)
United States Patent
Ananthanarayanan et al.

(10) Number: US 6,552,294 C1
(45) Certificate Issued: Sep. 19, 2006

(54) METHOD FOR METALLURGICALLY ATTACHING TOGETHER TWO MEMBERS

(75) Inventors: Ventakatasubramanian Ananthanarayanan, Beavercreek, OH (US); Desra N. Herbst, Dayton, OH (US); Kevin J. Szeszulski, Bay City, MI (US)

(73) Assignee: Delphi Technologies Inc., Troy, MI (US)

Reexamination Request:
No. 90/007,517, Apr. 22, 2005

Reexamination Certificate for:
Patent No.: 6,552,294
Issued: Apr. 22, 2003
Appl. No.: 09/969,066
Filed: Oct. 2, 2001

(51) Int. Cl.
*B23K 11/02* (2006.01)
*B23K 11/31* (2006.01)

(52) U.S. Cl. .................. 219/107; 219/59.1; 285/189

(58) Field of Classification Search ............... None
See application file for complete search history.

(56) References Cited

U.S. PATENT DOCUMENTS 1,292,812 A  1/1919 Lachman
6,182,361 B1 * 2/2001 Cox et al. ............... 29/888.1

* cited by examiner

*Primary Examiner*—Matthew C. Graham

(57) ABSTRACT

A first method for metallurgically attaching together two members. A first member is obtained having a through hole and having a longitudinally-projecting flange surrounding the through hole. A second member is obtained having a transversely-projecting annular rim. The second member is at least partially positioned in the through hole of the first member with the flange of the first member projecting away from the rim. The first and second members are resistance welded together, wherein after the weld is created, the rim of the second member is seated on the first member. In an other method, which is similar to the first method, the second member has no rim.

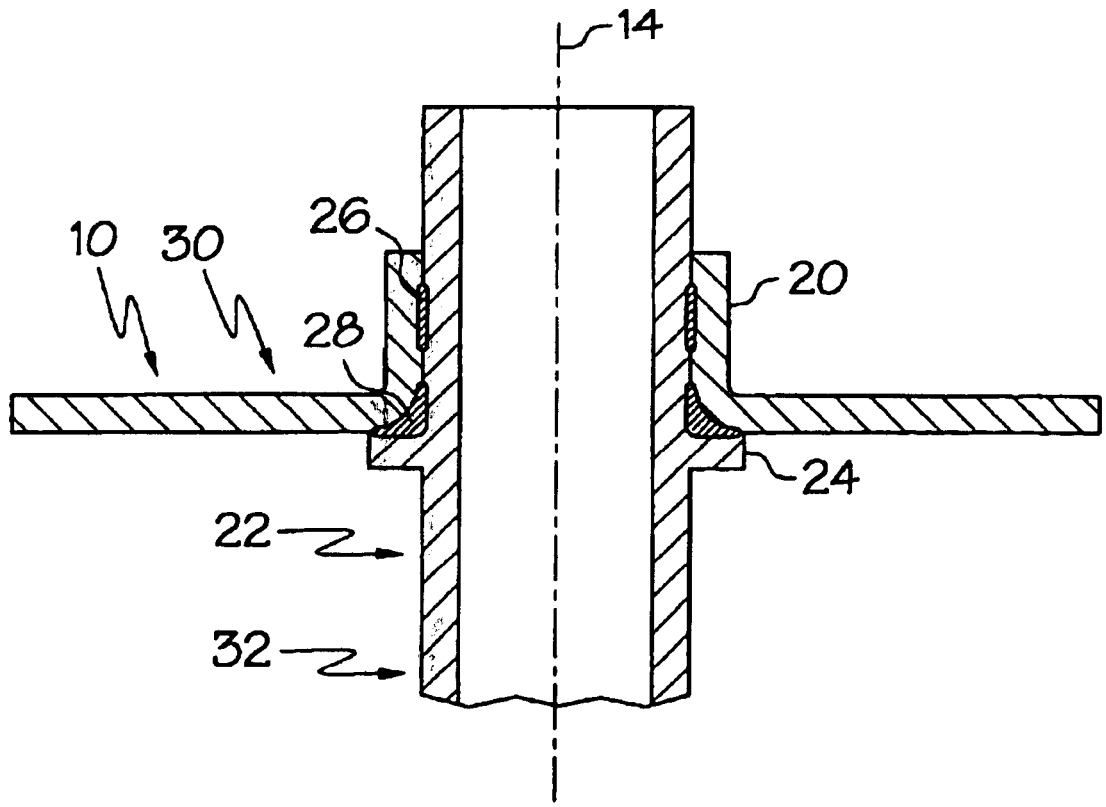

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8, 9 and 11–13 is confirmed.

Claims 1–4, 10 and 14–21 are cancelled.

Claim 5 is determined to be patentable as amended.

Claims 6 and 7, dependent on an amended claim, are determined to be patentable.

5. The method of claim 4, wherein step d) includes longitudinally engaging the flange of the plate with a first electrode shaped to create *an* interference *fit* between the flange and the tube, longitudinally engaging the rim of the tube with a second electrode, passing electric current between the first and second electrodes through the plate and the tube, and relatively moving the first and second electrodes longitudinally toward each other.

* * * * *